(12) United States Patent
Erlenmaier et al.

(10) Patent No.: US 8,439,811 B2
(45) Date of Patent: May 14, 2013

(54) LASER NOZZLE CHANGING DEVICE

(75) Inventors: Werner Erlenmaier, Gerlingen (DE); Frank Schmauder, Metzingen (DE); Armin Felber, Freienbach (CH); Reto Gedeon, Root (CH)

(73) Assignee: TRUMPF Maschinen AG, Baar (CH)

( * ) Notice: Subject to any disclaimer, the term of this patent is extended or adjusted under 35 U.S.C. 154(b) by 1162 days.

(21) Appl. No.: 12/351,249

(22) Filed: Jan. 9, 2009

(65) Prior Publication Data
US 2009/0179018 A1   Jul. 16, 2009

(30) Foreign Application Priority Data
Jan. 12, 2008   (EP) ..................................... 08000520

(51) Int. Cl.
*B23K 26/00* (2006.01)
*B23Q 3/157* (2006.01)

(52) U.S. Cl.
USPC ............ 483/16; 483/58; 483/66; 219/121.67; 219/121.72

(58) Field of Classification Search .................... 483/13, 483/16, 62, 63, 67; 219/121.67, 121.85; 29/40, 29/53, 55
See application file for complete search history.

(56) References Cited

U.S. PATENT DOCUMENTS

| | | | | | |
|---|---|---|---|---|---|
| 2,956,454 | A | * | 10/1960 | Hansen | ............................ 408/13 |
| 3,161,951 | A | * | 12/1964 | Anthony | ......................... 483/40 |
| 3,355,798 | A | * | 12/1967 | Drechsler | ........................ 483/63 |
| 4,858,290 | A | * | 8/1989 | Hirose et al. | .................... 29/35.5 |
| 6,716,146 | B2 | * | 4/2004 | Kato | ................................ 483/58 |
| 7,345,257 | B2 | * | 3/2008 | Yamazaki et al. | ......... 219/121.6 |
| 7,367,930 | B2 | * | 5/2008 | Yamazaki et al. | ............. 483/16 |
| 2006/0144831 | A1 | * | 7/2006 | Schmidt et al. | ........... 219/121.72 |
| 2007/0087924 | A1 | * | 4/2007 | Krosta et al. | ....................... 483/1 |
| 2009/0181837 | A1 | * | 7/2009 | Erlenmaier et al. | ............ 483/13 |
| 2009/0181838 | A1 | * | 7/2009 | Schmauder | ..................... 483/58 |

FOREIGN PATENT DOCUMENTS

| | | |
|---|---|---|
| DE | 10056330 | 3/2002 |
| DE | 102006028730 | 7/2007 |
| EP | 1454698 | 9/2004 |
| EP | 1602438 | 12/2005 |
| EP | 1602439 | 12/2005 |
| FR | 2547230 | 12/1984 |
| JP | 58192731 | 11/1983 |
| JP | 6023580 | 2/1994 |
| JP | 6023580 A | 2/1994 |
| JP | 2002160085 A | 6/2002 |

* cited by examiner

*Primary Examiner* — Alexander P Taousakis
(74) *Attorney, Agent, or Firm* — Fish & Richardson P.C.

(57) ABSTRACT

A mechanical device is used for mounting and/or dismounting a laser nozzle on and/or from a nozzle mount of a laser processing machine for processing workpieces, especially metal sheets. The mechanical device includes a nozzle magazine having a nozzle holder support on which a nozzle holder for a laser nozzle is supported. In addition, the mechanical device has a support positioning drive by means of which the nozzle holder support is positionable together with the nozzle holder in a support positioning direction. A lifting device of the mechanical device serves to position the nozzle holder, when positioned in the support positioning direction in a lifting stand-by position, relative to the nozzle holder support in a positioning lifting direction extending perpendicular to the support positioning direction.

14 Claims, 6 Drawing Sheets

LASER NOZZLE CHANGING DEVICE

CROSS REFERENCE TO RELATED APPLICATION

This application claims priority under 35 U.S.C. §119(a) to European Application No. 08 000 520.0, filed on Jan. 12, 2008, the entire contents of which are hereby incorporated by reference.

TECHNICAL FIELD

The invention relates to a mechanical device for changing a laser nozzle of a nozzle mount of a laser processing machine for processing workpieces.

BACKGROUND

JP 06 023580 A discloses a mechanical nozzle changing device that is mounted on a laser processing machine at the upper side of a horizontal workpiece table. A nozzle magazine, in the form of a turret magazine, of the nozzle changing device includes a magazine turret that can be rotated about a vertical turret rotation axis. A plurality of nozzle holders spaced from one another in the direction of rotation about the turret rotation axis are supported on the magazine turret. The nozzle holders each serve to hold a laser nozzle of the type used on the laser processing head.

SUMMARY

In one general aspect, a mechanical device is used to change a laser nozzle of a nozzle mount of a laser processing machine for processing workpieces. The mechanical device includes a nozzle magazine having a nozzle holder support, a nozzle holder configured to receive a laser nozzle, which nozzle holder is supported on the nozzle holder support of the nozzle magazine, a support positioning drive configured to position the nozzle holder support and the nozzle holder in a support positioning direction, and a lifting device configured to position the nozzle holder, when it is positioned in the support positioning direction in a lifting stand-by position, relative to the nozzle holder support in a positioning lifting direction extending perpendicular to the support positioning direction.

Implementations include one or more of the following features. For example, the lifting device can include a lifting-out element via which the nozzle holder is lifted out of its seat on the nozzle holder support and positioned in the positioning lifting direction by means of a lifting drive of the lifting device. The lifting-out element can be of a shaft-like construction. The lifting-out element can be connected to the nozzle holder.

The lifting device can include a lifting element that supports the nozzle holder positioned in the lifting stand-by position and that, by means of a lifting drive of the lifting device, is positionable in the positioning lifting direction together with the nozzle holder positioned in the lifting stand-by position.

The nozzle holder when it is positioned in the positioning lifting direction can be drivable about a nozzle holder rotation axis in a direction of rotation by means of a rotary drive. The direction of rotation can be a direction of rotation that enables a laser nozzle inside the nozzle holder to be mounted to the nozzle mount. The direction of rotation can be a direction of rotation that enables a laser nozzle attached to the nozzle mount to be dismounted from the nozzle mount inside of the nozzle holder. The nozzle holder when it is positioned in the positioning lifting direction can be drivable by means of the rotary drive about the nozzle holder rotation axis in the direction of rotation via the lifting-out element of the lifting device.

The nozzle magazine can be in the form of a turret magazine and, as such, can have a nozzle holder support in the form of a magazine turret that is, by means of the support positioning drive, positionable together with the nozzle holder supported on the magazine turret about a turret rotation axis in the support positioning direction.

In another general aspect, a laser processing machine for processing workpieces includes a nozzle mount for a laser nozzle, and a mechanical device for changing a laser nozzle of the nozzle mount. The mechanical device includes a nozzle magazine having a nozzle holder support, a nozzle holder configured to receive a laser nozzle, which nozzle holder is supported on the nozzle holder support of the nozzle magazine, a support positioning drive configured to position the nozzle holder support and the nozzle holder in a support positioning direction, and a lifting device configured to position the nozzle holder, when it is positioned in the support positioning direction in a lifting stand-by position, relative to the nozzle holder support in a positioning lifting direction extending perpendicular to the support positioning direction.

The mechanical device for changing laser nozzles is flexible in regards its arrangement, as is a laser processing machine provided with such a device.

The mechanical device offers the possibility of positioning nozzle holders, for example, when nozzles are being changed, in two directions extending perpendicular to each other. The nozzle holder or holders of the device may be positioned relative to the nozzle mount of a laser processing machine in both directions. Owing to the positionability of the nozzle holder or holders, the installation site of the mechanical device for mounting and/or dismounting laser nozzles may be chosen in a flexible manner, without any detrimental effect on the mutual accessibility of the nozzle holder and the nozzle mount fitted to the machine, which is necessary for the mounting and/or dismounting of laser nozzles. Movement of the nozzle holder or holders is effected on the one hand by means of the claimed support positioning drive and on the other hand by means of the lifting device. The support positioning drive positions the nozzle holder support and the nozzle holder or holders supported thereon in the support positioning direction. The lifting device serves to move the nozzle holder or holders relative to the nozzle holder support in a direction perpendicular to the support positioning direction.

The mechanical device provides a constructionally simple and operationally reliable configuration of the lifting device for the nozzle holder or holders.

When raised relative to the nozzle holder support in the positioning lifting direction, the nozzle holder is able to execute a mounting or dismounting rotational movement and is thereby able, in particular, to screw a laser nozzle in or out at the nozzle mount of a laser processing machine.

The lifting-out element of the lifting device for the nozzle holder is used as a transmission element of the rotary drive by means of which the nozzle holder, when positioned in the positioning lifting direction, may be driven in the mounting direction of rotation and/or in the dismounting direction of rotation.

The nozzle magazine of the mechanical device for mounting and/or dismounting laser nozzles can be in the form of a turret magazine on which a magazine turret supports the nozzle holder or holders. That form of the nozzle magazine is distinguished by an especially compact configuration.

The details of one or more embodiments of the invention are set forth in the accompanying drawings and the description below. Other features and advantages of the invention will be apparent from the description and drawings, and from the claims.

DETAILED DESCRIPTION

Figure 2:
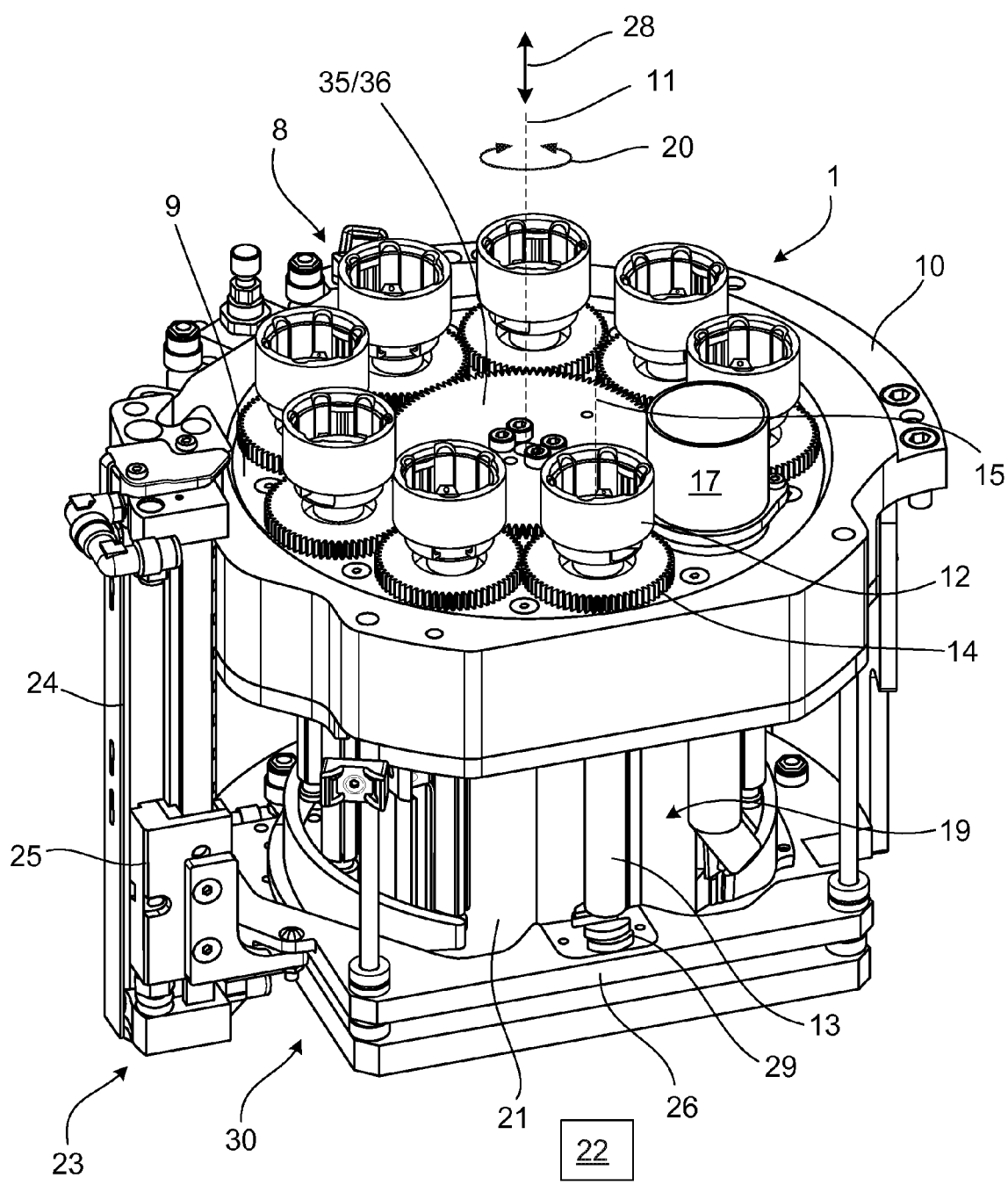
FIG. 2 is a perspective view of the mechanical nozzle changing device of FIG. 1, with a second rotational position of the magazine turret.
Figure 3:
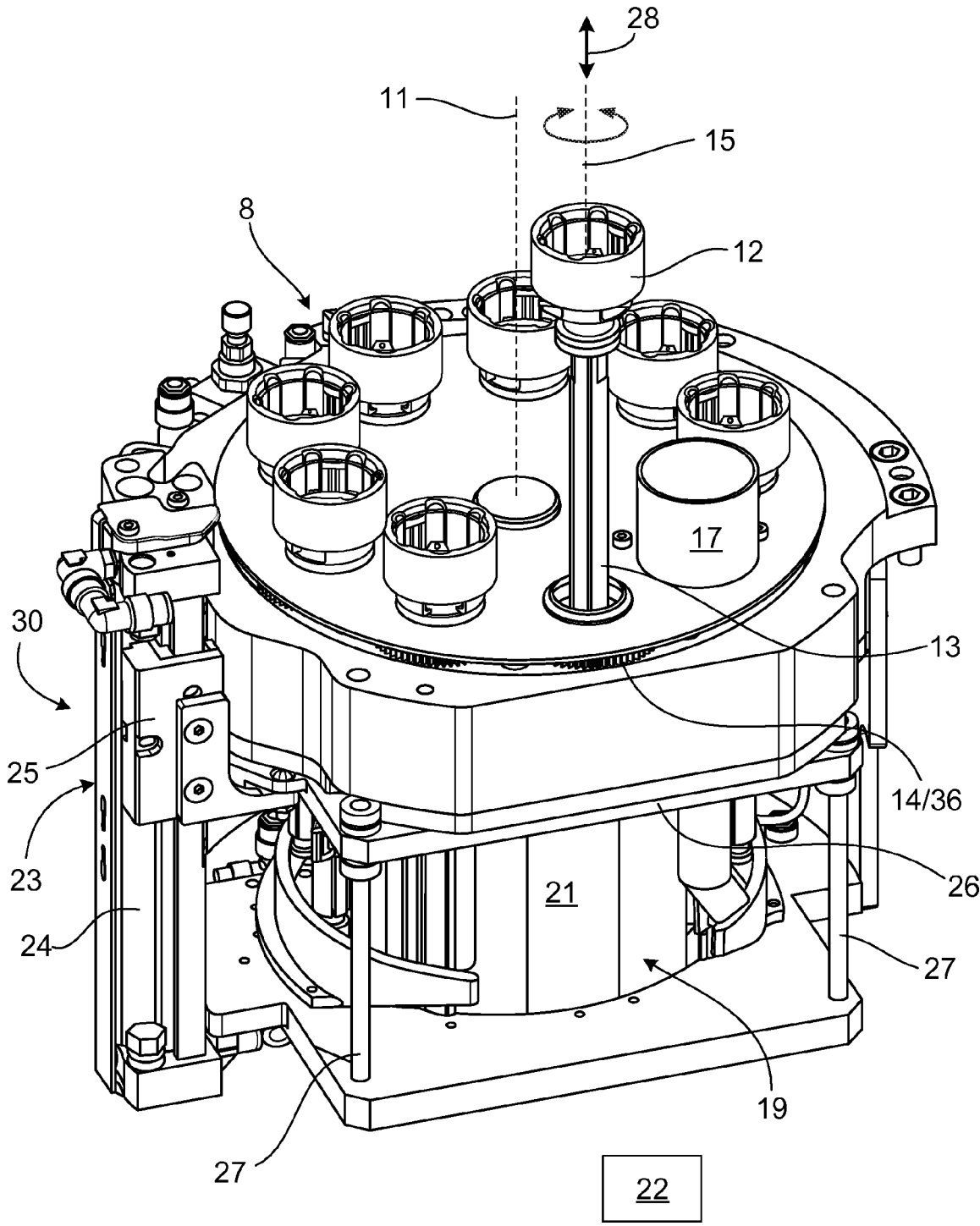
FIG. 3 is a perspective view of the mechanical nozzle changing device of FIG. 2, with a nozzle holder lifted out of the magazine turret.
Figure 4:
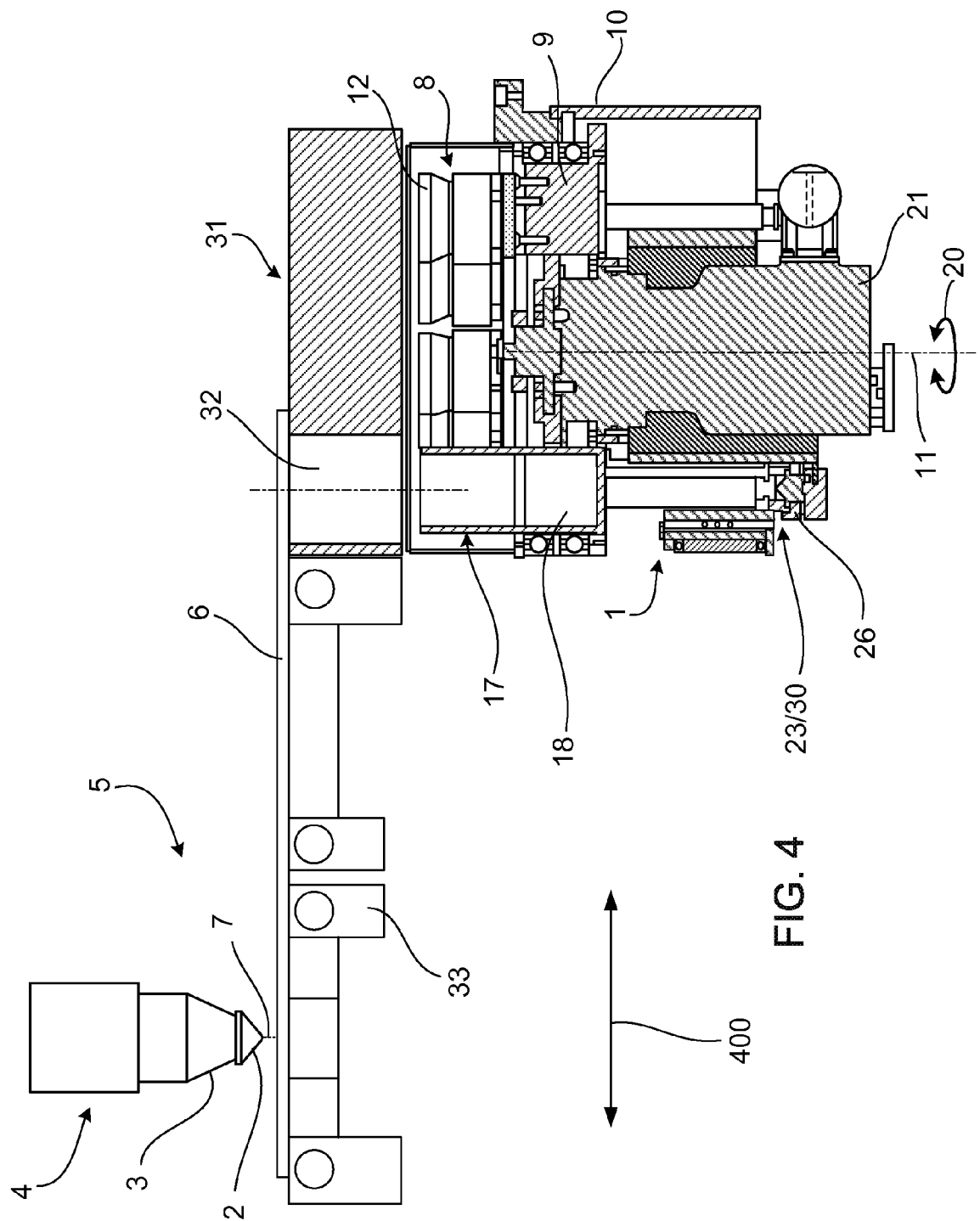
FIG. 4 is a side cross-sectional view of a laser processing machine with the mechanical nozzle changing device of FIG. 1.

Referring to FIGS. 1-6, a nozzle changing device 1 serves as a mechanical device for changing laser nozzles 2 of a nozzle mount 3 that is provided on a laser processing head 4 of a laser processing machine 5. The laser nozzles 2 are changed by mounting a new laser nozzle 2 to the nozzle mount 3 and/or by dismounting an old laser nozzle 2 from the nozzle mount 3. As shown in FIG. 4, in normal operation, a metal sheet 6 is cut on the laser processing machine 5 by means of a laser cutting beam 7.

The nozzle changing device 1 includes a nozzle magazine in the form of a turret magazine 8. A magazine turret 9 acting as a nozzle holder support is supported to be rotatable on a housing 10 of the nozzle changing device 1 about a turret rotation axis 11 and along a rotational path (also referred to as a support positioning or turret positioning direction) shown by a double-headed arrow 20.

A plurality of nozzle holders 12 are inserted into the magazine turret 9. Attached to each of the nozzle holders 12 there is a shaft-like lifting-out element (which will be referred to also as simply a "shaft") 13 that projects downwardly beyond the magazine turret 9 and has a cross-section differing from a circular shape. On the upper side of the magazine turret 9, planetary gear wheels 14 are each supported to be rotatable about a respective gear wheel rotation axis 15. The gear wheel rotation axes 15 at the same time form nozzle holder rotation axes.

The planetary gear wheels 14 each have an internal opening 16 where the shaft 13 of the relevant nozzle holder 12 passes through them in a vertical direction. In addition to the nozzle holders 12, a so-called "dummy station" 17, having a hollow-cylinder-like passage 18, is provided on the magazine turret 9 of the turret magazine 8. For simplicity, in FIGS. 1-3 all of the nozzle holders 12 are shown empty, i.e., without a laser nozzle 2. In operational use of the nozzle changing device 1 on the laser processing machine 5, at least one nozzle holder 12 is occupied by a laser nozzle 2, which is to be mounted on the laser processing head 4.

By means of a support positioning or turret positioning drive 19, the magazine turret 9 can be moved about the turret rotation axis 11 to various rotational positions in the support positioning or turret positioning direction 20. An important component of the turret positioning drive 19 is an electrical turret positioning motor 21, which is controlled by means of a numerical drive control 22 indicated in FIGS. 1-3. When the nozzle changing device 1 is in use, the numerical drive control 22 is integrated as a component of the laser processing machine 5 in a computer numerical control (CNC) system thereof.

In addition to having the turret positioning drive 19, the nozzle changing device 1 has a pneumatic lifting drive 23 that includes a lifting cylinder 24 fastened to the housing 10 of the nozzle changing device 1 and that is likewise controlled by the drive control 22.

In the interior of the lifting cylinder 24, a piston, not visible in the drawings, is guided to be movable in the vertical direction (that is, the direction parallel to the turret rotation axis 11). The piston of the pneumatic lifting drive 23 is connected, without the interposition of a piston rod, to an intermediate piece 25, which in turn acts on a lifting element in the form of a lifting plate 26. The lifting plate 26 is guided to be movable in a vertical positioning lifting direction (double-headed arrow 28) along guide rods 27 of the housing 10 of the nozzle changing device 1. Provided between the guide rods 27 and on the lifting plate 26 there is a shaft-receiving element 29, which is open in the turret positioning direction 20 for receiving the free end of the shaft 13 attached to the nozzle holders 12. Like the pneumatic lifting drive 23, the lifting plate 26 and the lifting-out elements 13 form part of a lifting device 30 for the nozzle holders 12.

Figure 1:
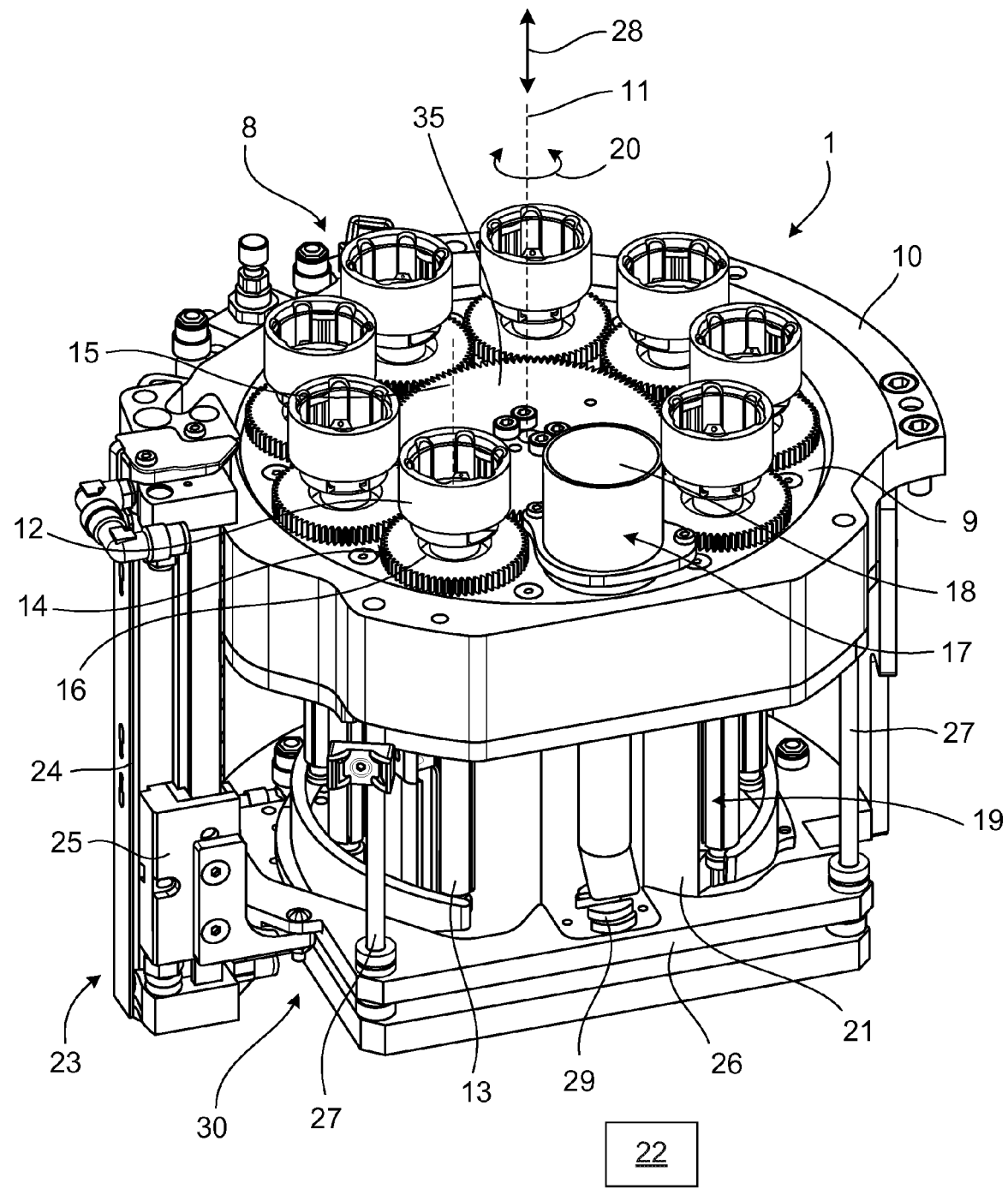
FIG. 1 is a perspective view of a mechanical nozzle changing device with a nozzle magazine in the form of a turret magazine, the magazine turret of which is in a first rotational position.

The operating condition illustrated in FIG. 1 for the nozzle changing device 1 is associated with normal operation of the laser processing machine 5. On the nozzle changing device 1, the dummy station 17 is situated with the hollow cylinder-like passage 18 above the shaft-receiving element 29 provided on the lifting plate 26 of the lifting device 30.

Figure 5:
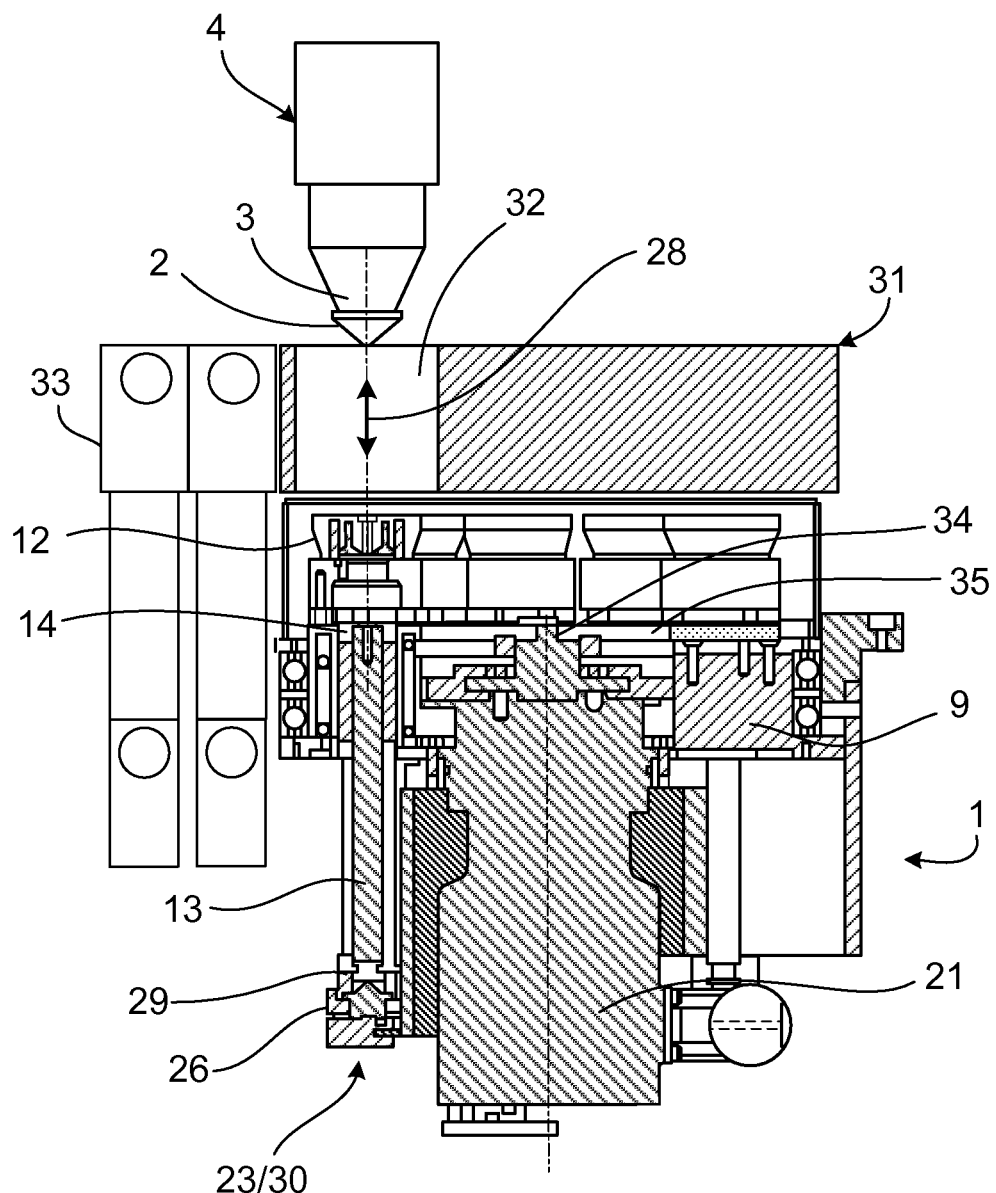
FIG. 5 is a side cross-sectional view of the laser processing machine of FIG. 4, with the mechanical nozzle changing device as shown in FIG. 2.
Figure 6:
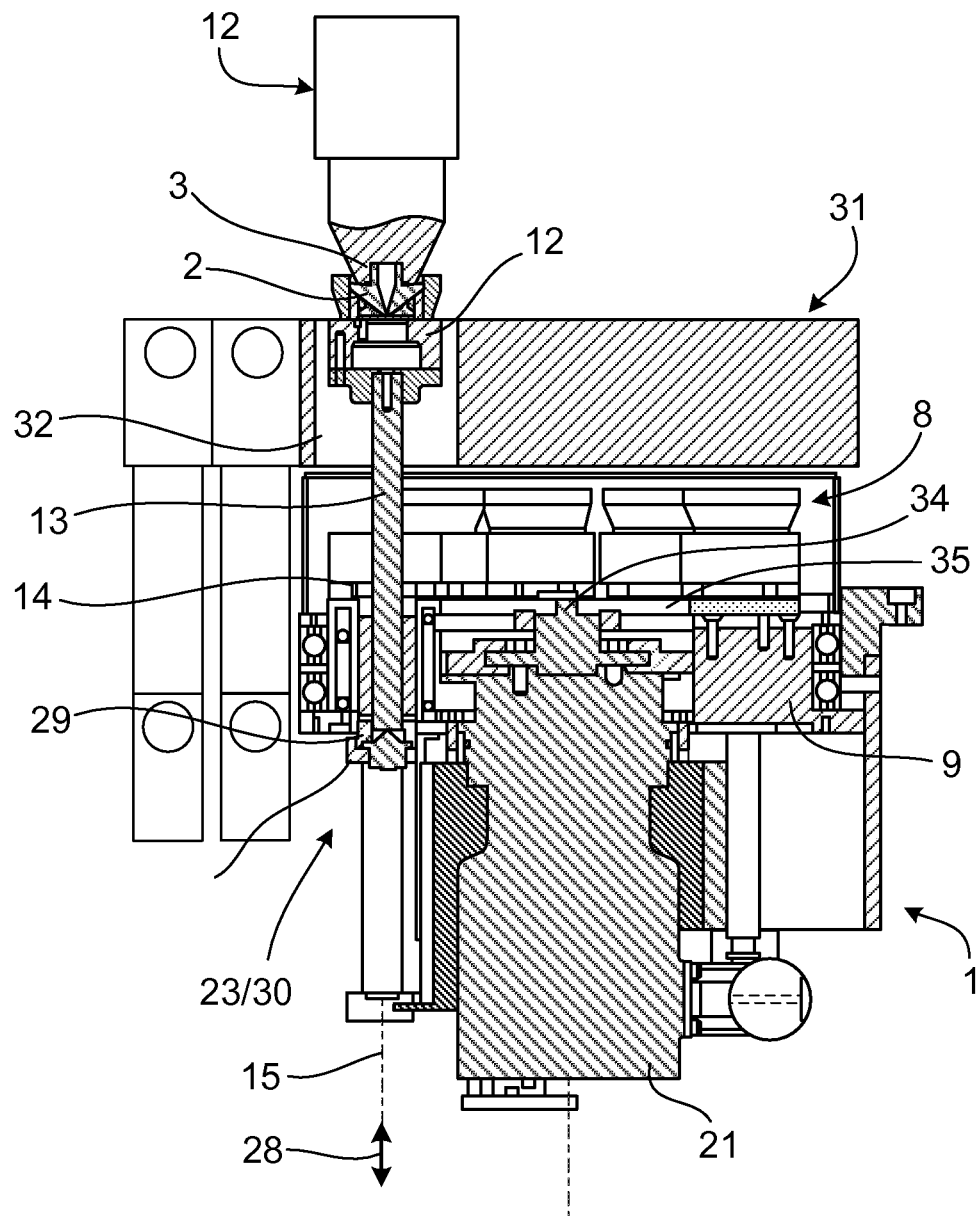
FIG. 6 is a side cross-sectional view of the laser processing machine of FIG. 5, with the mechanical nozzle changing device as shown in FIG. 3.

The nozzle changing device 1 is disposed on the laser processing machine 5, as shown in FIGS. 4-6, on the underside of a workpiece support 31 of the laser processing machine 5.

In normal cutting operation of the laser processing machine 5, and accordingly in the operating condition of the nozzle changing device 1 illustrated in FIG. 1, the dummy station 17, or rather its hollow cylinder-like passage 18, is situated as shown in FIG. 4 beneath a passage opening 32 in the workpiece support 31. Contaminating particles, especially slag and metal spatters produced during processing of the metal sheet 6 by cutting, are able to pass by gravity through the nozzle changing device 1 through the hollow cylinder-like passage 18 of the dummy station 17 while the nozzle holders 12 of the turret magazine 8 are protected against undesirable contamination in a position remote from the passage opening 32 of the workpiece support 31.

If the laser nozzle 2 mounted on the laser processing head 4 of the laser processing machine 5 is to be exchanged for another laser nozzle 2, for example, on account of a change of the material to be processed or because of pollution to the laser nozzle 2, during a break in the normal cutting operation of the laser processing machine 5, a discharge flap 33 provided at the workpiece support 31 of the laser processing machine 5 is first opened from the closed position shown in FIG. 4. Then, the laser processing head 4, on the one hand, and the workpiece support 31 together with the nozzle changing device 1, on the other hand, are moved relative to each other in a horizontal direction 400 until the laser processing head 4 with the laser nozzle 2 that is to be replaced arrives over the passage opening 32 in the workpiece support 31. Simultaneously with the described relative movement of laser processing head 4 and workpiece support 31 and nozzle changing device 1, the turret positioning motor 21 of the nozzle changing device 1 is actuated. Under the control of the drive control 22, the turret positioning motor 21 moves the magazine turret 9 of the nozzle changing device 1 in the turret positioning direction 20 over a defined angle of rotation. The magazine turret 9 is drivingly connected to the turret positioning motor 21 during that operation by means of a switchable clutch not shown in detail.

The positioning movement of the magazine turret 9 ends as soon as an empty nozzle holder 12, which follows the dummy station 17 in the direction of rotation, reaches the lifting stand-by position shown in FIG. 2. In the lifting stand-by position, the empty nozzle holder 12 is situated above the shaft-receiving element 29 on the lifting plate 26 of the lifting device 30. The shaft 13 provided on the empty nozzle holder 12 has run by its free lower end into the shaft-receiving element 29 on the lifting plate 26 and is engaged by the lifting plate 26 from behind at the end remote from the nozzle holder 12.

The situation obtained at the laser processing machine 5 in the operating condition of the nozzle changing device 1 illustrated in FIG. 2 can be seen from FIG. 5.

Accordingly, the empty nozzle holder 12 is situated beneath the passage opening 32 in the workpiece support 31 and, in the positioning lifting direction 28, opposite the laser nozzle 2 that is to be dismounted.

Starting from that situation, the lifting drive 23 is actuated under the control of the drive control 22. The lifting plate 26 of the lifting device 30 moves upwards and in so doing, by means of the shaft 13, lifts the empty nozzle holder 12 out of its seat on the magazine turret 9 of the turret magazine 8. As a result of the upward movement of the empty nozzle holder 12, the laser nozzle 2 on the laser processing head 4 enters the interior of the nozzle holder 12. The situation illustrated in FIG. 6 is thus obtained. The nozzle changing device 1 is in the operating condition shown in FIG. 3. In FIG. 3, the planetary gear wheels 14, for example, unlike in FIGS. 1 and 2, are provided with a cover. In the operating condition shown in FIGS. 3 and 6, the turret positioning motor 21 has been uncoupled from the magazine turret 9 by means of the clutch device not shown in detail.

The turret positioning motor 21 is set in operation and, by means of a sun gear wheel 35 mounted on a motor shaft 34, drives the planetary gear wheels 14, which are supported to be rotatable on the magazine turret 9 that is now secured against rotation, about the gear wheel rotation axes 15. In particular, that planetary gear wheel 14 through which there passes the shaft 13 on the nozzle holder 12 that has been lifted out upwardly is also driven in rotation. Owing to corresponding geometries of the internal opening 16 of the planetary gear wheel 14, on the one hand, and of the cross-section of the upwardly moved shaft 13, on the other hand, the shaft 13 is rotated by the planetary gear wheel 14 in the direction of rotation thereof.

With an appropriate direction of rotation of the turret positioning motor 21, the nozzle holder 12 disposed at the laser nozzle 2 that is to be dismounted is driven by the associated planetary gear wheel 14 and the shaft 13 attached thereto in a dismounting direction of rotation. The nozzle holder 12 takes the laser nozzle 2 that it has received with it in the dismounting direction of rotation and the laser nozzle 2 mounted on the laser processing head 4 is screwed out of the nozzle mount 3 of the laser processing head 4. While being resiliently supported by means of the nozzle holder 12, the laser nozzle 2 is able to sink downwards during the screwing-out operation. The turret positioning motor 21, when uncoupled from the magazine turret 9, and the sun gear wheel 35, the relevant planetary gear wheel 14 and the shaft 13 driven by the latter form a rotary drive 36 for the nozzle holder 12.

Once the laser nozzle 2 that is to be replaced has been dismounted, the lifting drive 23 of the nozzle changing device 1 is actuated again. The lifting plate 26 of the lifting device 30 is lowered in the positioning lifting direction 28 to its starting position. The nozzle holder 12 charged with the used laser nozzle 2 is then seated on the magazine turret 9 of the turret magazine 8 again.

The lifting device 30 allows nozzle changing to be carried out on the laser processing machine 5 also in the case where a nozzle changing device 1 is disposed beneath the workpiece support 31. To that extent, the lifting device 30 affords especial flexibility in the choice of installation site for the nozzle changing device 1.

Once the nozzle holder 12 with the used laser nozzle 2 has been lowered into the magazine turret 9 and the turret positioning motor 21 has been coupled to the magazine turret 9 again, the turret positioning motor 21 is actuated and, as a result, the magazine turret 9 is positioned in the turret positioning direction 20 until a nozzle holder 12 containing a laser nozzle 2 that is to be mounted on the laser processing head 4 reaches the lifting stand-by position. With the turret positioning motor 21 being uncoupled from the magazine turret 9 again, the lifting drive 23 is actuated again. By means of the lifting plate 26 the nozzle holder 12 provided with the laser nozzle 2 that is to be mounted is raised in the positioning lifting direction 28 until the laser nozzle 2 that is to be mounted is placed by its thread on the front end of the thread of the nozzle mount 3 at the laser processing head 4. During that operation, the new laser nozzle 2 is supported in the vertical direction under spring bias against the edge of the nozzle mount 3 on the laser processing head 4. When the turret positioning motor 21 is then driven in the appropriate direction of rotation, the raised nozzle holder 12 with the laser nozzle 2 situated therein is moved in the mounting direction of rotation by way of the sun gear wheel 35 and the relevant planetary gear wheel 14, and the laser nozzle 2 is thereby screwed into the nozzle mount 3 of the laser processing head 4.

When the screwing-in operation has been completed, the lifting drive 23 is actuated again and the then empty nozzle holder 12 is lowered towards the magazine turret 9. The situation corresponding to that illustrated in FIG. 5 is thus obtained.

Once the magazine turret 9 has been re-coupled to the turret positioning motor 21, by actuation of the turret positioning motor 21, the dummy station 17 with the hollow-cylinder-like passage 18 is turned over the shaft-receiving element 29 on the lifting plate 26 of the lifting device 30. After closing of the discharge flap 33 and after a suitable relative movement of laser processing head 4 and workpiece support 31, the situation shown in FIG. 4 is produced again. The nozzle changing device 1 is then situated once more in the operating condition shown in FIG. 1. Regular cutting operation may be resumed on the laser processing machine 5.

OTHER EMBODIMENTS

A number of embodiments have been described. Nevertheless, it will be understood that various modifications may be made without departing from the spirit and scope of the invention. Accordingly, other embodiments are within the scope of the following claims.

What is claimed is:

1. A mechanical device for changing a laser nozzle of a nozzle mount of a laser processing machine for processing workpieces, the mechanical device comprising:
   a nozzle magazine having a nozzle holder support,
   a nozzle holder configured to receive the laser nozzle, which nozzle holder is supported on the nozzle holder support of the nozzle magazine,
   a support positioning drive configured to move the nozzle holder support and the nozzle holder in a support positioning direction, and
   a lifting device configured to move the nozzle holder, when the nozzle holder is positioned in a lifting stand-by position along the support positioning direction, relative to the nozzle holder support to a mount/dismount position along a positioning lifting direction extending perpendicular to the support positioning direction,
   wherein the nozzle holder, when positioned in the mount/dismount position, is drivable about a nozzle holder rotation axis that passes through a center of the nozzle holder, by a rotary drive such that the laser nozzle, when received by the nozzle holder, is mountable to the nozzle mount of the laser processing machine or such that the laser nozzle, when mounted to the nozzle mount of the laser processing machine, is dismountable from the nozzle mount of the laser processing machine.

2. The mechanical device of claim 1, wherein the lifting device comprises a lifting-out element via which the nozzle holder is lifted out of its seat on the nozzle holder support and moved in the positioning lifting direction by a lifting drive of the lifting device.

3. The mechanical device of claim 2, wherein the lifting-out element is of a shaft-like construction.

4. The mechanical device of claim 2, wherein the lifting-out element is connected to the nozzle holder.

5. The mechanical device of claim 1, wherein the lifting device comprises a lifting element that supports the nozzle holder positioned in the lifting stand-by position and that, by a lifting drive of the lifting device, is movable in the positioning lifting direction together with the nozzle holder positioned in the lifting stand-by position.

6. The mechanical device of claim 2, wherein the nozzle holder, when positioned in the mount/dismount position, is drivable by the rotary drive about the nozzle holder rotation axis via the lifting-out element of the lifting device.

7. The mechanical device of claim 1, wherein the nozzle magazine has a nozzle holder support in the form of a magazine turret that is, by the support positioning drive, movable together with the nozzle holder supported on the magazine turret about a turret rotation axis in the support positioning direction.

8. A laser processing machine for processing workpieces, the laser processing machine comprising:
   a nozzle mount for a laser nozzle; and
   a mechanical device for changing the laser nozzle of the nozzle mount, the mechanical device comprising:
      a nozzle magazine having a nozzle holder support,
      a nozzle holder configured to receive the laser nozzle, which nozzle holder is supported on the nozzle holder support of the nozzle magazine,
      a support positioning drive configured to move the nozzle holder support and the nozzle holder in a support positioning direction, and
      a lifting device configured to move the nozzle holder, when the nozzle holder is positioned in a lifting stand-by position along the support positioning direction, relative to the nozzle holder support to a mount/dismount position along a positioning lifting direction extending perpendicular to the support positioning direction,
      wherein the nozzle holder, when positioned in the mount/dismount position, is drivable about a nozzle holder rotation axis that passes through a center of the nozzle holder by a rotary drive such that the laser nozzle, when received by the nozzle holder, is mountable to the nozzle mount of the laser processing machine or such that the laser nozzle, when mounted to the nozzle mount of the laser processing machine, is dismountable from the nozzle mount of the laser processing machine.

9. The laser processing machine of claim 8, wherein the lifting device comprises a lifting-out element via which the nozzle holder is lifted out of its seat on the nozzle holder support and moved in the positioning lifting direction by a lifting drive of the lifting device.

10. The laser processing machine of claim 9, wherein the lifting-out element is of a shaft-like construction.

11. The laser processing machine of claim 9, wherein the lifting-out element is connected to the nozzle holder.

12. The laser processing machine of claim 8, wherein the lifting device comprises a lifting element that supports the nozzle holder positioned in the lifting stand-by position and that, by a lifting drive of the lifting device, is movable in the positioning lifting direction together with the nozzle holder positioned in the lifting stand-by position.

13. The laser processing machine of claim 9, wherein the nozzle holder, when positioned in the mount/dismount position, is drivable by the rotary drive about the nozzle holder rotation axis via the lifting-out element of the lifting device.

14. The mechanical device of claim 8, wherein the nozzle magazine has a nozzle holder support in the form of a magazine turret that is, by means of the support positioning drive, movable together with the nozzle holder supported on the magazine turret about a turret rotation axis in the support positioning direction.

* * * * *

UNITED STATES PATENT AND TRADEMARK OFFICE
CERTIFICATE OF CORRECTION

PATENT NO. : 8,439,811 B2
APPLICATION NO. : 12/351249
DATED : May 14, 2013
INVENTOR(S) : Werner Erlenmaier et al.

It is certified that error appears in the above-identified patent and that said Letters Patent is hereby corrected as shown below:

In the Claims:

Column 8, line 48 (Claim 14, line 48), delete "mechanical device" and insert --laser processing machine--.

Column 8, line 50 (Claim 14, line 50), after "by" delete "means of".

Signed and Sealed this
Eighth Day of October, 2013

Teresa Stanek Rea
*Deputy Director of the United States Patent and Trademark Office*